(12) United States Patent
Hsiao et al.

(10) Patent No.: US 7,139,153 B2
(45) Date of Patent: Nov. 21, 2006

(54) MAGNETIC POLE TIP FOR PERPENDICULAR MAGNETIC RECORDING

(75) Inventors: Richard Hsiao, San Jose, CA (US); Wipul Pemsiri Jayaekara, Los Gatos, CA (US); Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 376 days.

(21) Appl. No.: 10/785,236

(22) Filed: Feb. 23, 2004

(65) Prior Publication Data

US 2005/0185338 A1    Aug. 25, 2005

(51) Int. Cl.
*G11B 5/147* (2006.01)
(52) U.S. Cl. .................................... 360/126
(58) Field of Classification Search ............ None
See application file for complete search history.

(56) References Cited

U.S. PATENT DOCUMENTS

| | | | | |
|---|---|---|---|---|
| 4,791,719 A | 12/1988 | Kobayashi et al. | ............ | 29/603 |
| 4,878,290 A | 11/1989 | Masud et al. | ................. | 29/603 |
| 5,658,470 A | 8/1997 | Schultz et al. | ................ | 216/22 |
| 6,419,845 B1 | 7/2002 | Sasaki | .......................... | 216/22 |
| 2006/0109588 A1* | 5/2006 | Le et al. | ..................... | 360/126 |

FOREIGN PATENT DOCUMENTS

| | | |
|---|---|---|
| JP | 61057016 | 3/1986 |
| JP | 64001215 | 1/1989 |
| JP | 3120606 | 5/1991 |
| JP | 4195908 | 7/1992 |
| JP | 4219609 | 8/1992 |
| JP | 4285710 | 10/1992 |
| JP | 5054327 | 3/1993 |

OTHER PUBLICATIONS

"Manufacture of Thin Film Magnetic Head", Aug. 1981, IBM Technical Disclosure Bulletin, p. 1470.

* cited by examiner

*Primary Examiner*—A. J. Heinz
(74) *Attorney, Agent, or Firm*—Zilka-Kotab, PC

(57) ABSTRACT

A method for forming a magnetic structure, such as a pole tip, includes forming a pole tip layer of magnetic material. A layer of polyimide precursor material is added above the pole tip layer and cured. A silicon-containing resist layer is added above the layer of polyimide precursor material and patterned. The resist layer is exposed to oxygen plasma for converting the resist into a glass-like material. Exposed portions of the cured polyimide precursor material are removed for exposing portions of the pole tip layer. The exposed portions of the pole tip layer are removed for forming a pole tip. Chemical mechanical polishing (CMP) can then be performed to remove any unwanted material remaining above the pole tip.

10 Claims, 10 Drawing Sheets

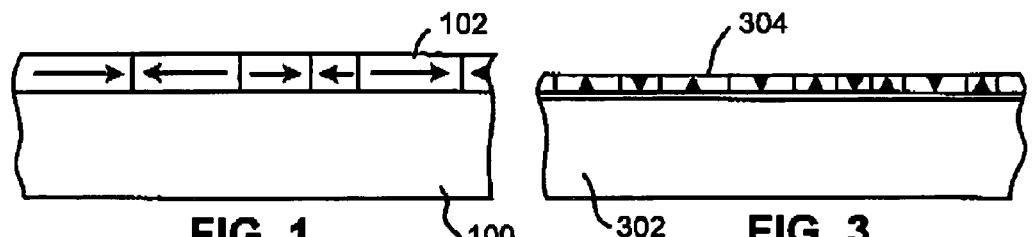
FIG. 1
(PRIOR ART)
FIG. 3
(PRIOR ART)
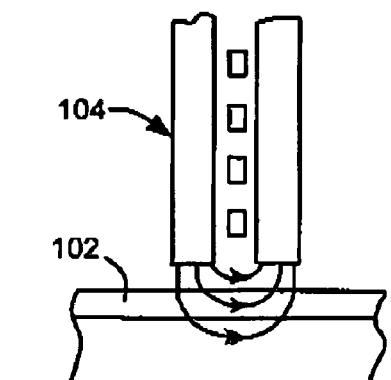
FIG. 2
(PRIOR ART)
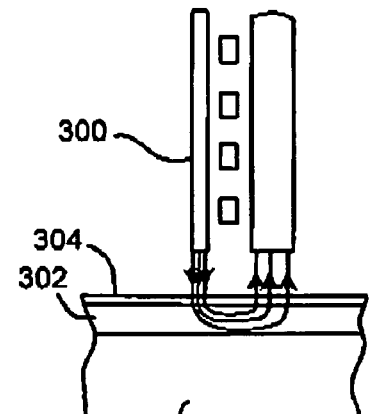
FIG. 4
(PRIOR ART)
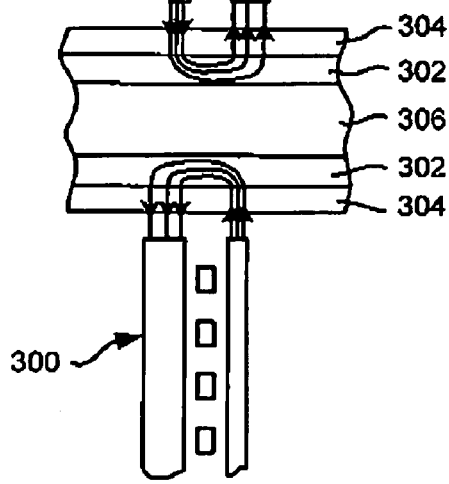
FIG. 5
(PRIOR ART)

MAGNETIC POLE TIP FOR PERPENDICULAR MAGNETIC RECORDING

FIELD OF THE INVENTION

The present invention relates to a method of patterning magnetic structures, and more particularly, this invention relates to a method of patterning particularly useful for perpendicular head fabrication.

BACKGROUND OF THE INVENTION

In a typical head, an inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

FIG. 1 illustrates, schematically, a conventional recording medium such as used with conventional magnetic disc recording systems. This medium is utilized for recording magnetic impulses in or parallel to the plane of the medium itself. The recording disc, a recording disc in this instance, comprises basically a supporting substrate 100 of a suitable non-magnetic material such as glass, with an overlying coating 102 of a suitable and conventional magnetic layer.

FIG. 2 shows the operative relationship between a conventional recording/playback head 104, which may preferably be a thin film head, and a conventional recording medium, such as that of FIG. 1.

FIG. 3 illustrates schematically the orientation of magnetic impulses substantially perpendicular to the surface of the recording medium. For such perpendicular recording the medium includes an under layer 302 of a material having a high magnetic permeability. This under layer 302 is then provided with an overlying coating 304 of magnetic material preferably having a high coercivity relative to the under layer 302.

Two embodiments of storage systems with perpendicular heads 300 are illustrated in FIGS. 3 and 4 (not drawn to scale). The recording medium illustrated in FIG. 4 includes both the high permeability under layer 302 and the overlying coating 304 of magnetic material described with respect to FIG. 3 above. However, both of these layers 302 and 304 are shown applied to a suitable substrate 306.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 302 back to the return layer (P1) of the head 300.

FIG. 5 illustrates a similar structure in which the substrate 306 carries the layers 302 and 304 on each of its two opposed sides, with suitable recording heads 300 positioned adjacent the outer surface of the magnetic coating 304 on each side of the medium.

As perpendicular heads become smaller to accommodate ever increasing data density, fabrication processes must be adapted to properly create the fragile structures that will ultimately form the head. Current fabrication methods are not capable of adequately and consistently forming pole tips to the scale and tolerances required for modern disk drives.

One proposed process uses a patterned photoresist mask 602 formed above a pole tip layer of magnetic material 604 and a layer of nonmagnetic material 606 such as $Al_2O_3$. The structure 600 is shown in FIG. 6. The structure 600 is milled to form the pole tip from the layer of magnetic material 604. The resulting structure 700 is shown in FIG. 7. While the process forms a pole tip 702 with the desired tapered cross-section, there are several disadvantages. First, this process does not scale easily below 0.25 µm, which is necessary for high data density drives. Second, the resist 602 does not have an acceptable mill resistance, i.e., too much of the mask 602 is consumed in the mill process. The result is that the pole tip is sometimes damaged by the milling. Third, removal of the resist 602 is necessary at the pole tip 702 without knocking over or destroying the pole tip 702. However, milling inherently produces redeposition 704, which tends to form on the sides of the resist 602, and may even encapsulate the resist. This redeposition makes removal of the resist 602 more difficult, as solvent has a harder time reaching the resist-pole tip interface. If any resist 602 remains coupled to the pole tip 702, attempted removal of the resist 602 tends to tip the pole tip 702 over. Further, some of the resist 602 may be entirely encapsulated by the redeposition. This is unacceptable, as having a layer of soft polymer (resist) at the ABS causes hard disk drive tribology issues, i.e., head-disk interface problems such as wear, water uptake, swelling, etc. Rather, it is desirable to have only hard materials at the ABS.

Another proposed process uses an alumina hard mask layer 802 above a pole tip layer 804. Instead of photoresist, a layer of NiFe (nonmagnetic) 806 is plated on top of the hard mask layer 802 and trimmed and notched to form the structure 800 shown in FIG. 8. Then, the structure 800 is milled to form the pole tip 902, as shown in FIG. 9. This process avoids having to remove photoresist, but the extended milling required to mill through the layer of NiFe 806 and alumina hard mask layer 802 create cavities adjacent to the pole tip 902. Thus, the desired tapered shape of the pole tip 902 is difficult to achieve. Further, if further processing is to be performed above the pole tip 902, the layer of NiFe 806 and possibly the alumina hard mask layer 802 may need to be removed to reduce the overall head size and provide a smooth surface upon which to add the additional layers. Removal of these layers without damaging the pole tip 902 is difficult.

What is needed is a method of fabricating pole tips of very small scale while overcoming the aforementioned disadvantages.

SUMMARY OF THE INVENTION

The present invention overcomes the disadvantages described above by providing a method of patterning standard and thin film magnetic structures, and that is particularly adapted to perpendicular heads.

A method for forming a magnetic structure, such as a pole tip, includes forming a layer of magnetic material, hereinafter referred to as a pole tip layer. A layer of polyimide precursor material is added above the pole tip layer. The polyimide precursor material is cured to convert at least a substantial portion of the polyimide precursor material to at least one of a polyimide and a polyimide-like material. A silicon-containing resist layer is added above the layer of polyimide precursor material. The resist layer is patterned. The resist layer is also exposed to oxygen plasma for converting the resist into a glass-like material. Exposed portions of the cured polyimide precursor material are removed for exposing portions of the pole tip layer for defining a width of the pole tip. The exposed portions of the pole tip layer are removed for forming a pole tip. Chemical mechanical polishing (CMP) can then be performed to remove any unwanted material remaining above the pole tip.

The exposed portions of the cured polyimide precursor material can be removed by reactive ion etching. The exposed portions of the cured polyimide precursor material can be removed by reactive ion etching with an oxygen-containing plasma. The exposed portions of the pole tip layer can be removed by milling.

Several optional layers can be added. A first layer of material resistant to chemical mechanical polishing can be added above the pole tip layer to protect the pole tip during the CMP. A layer of nonmagnetic material can be added for substantially encapsulating the pole tip for reducing the tendency of the pole tip to tip over during CMP. Also, a second layer of material resistant to chemical mechanical polishing can be added above the layer of nonmagnetic material to further protect the pole tip from CMP damage.

Additional options include alteration of the mask layer where the mask layer contains a layer that is etch resistant to an oxygen-containing plasma. This may include a hard etch mask that is patterned in a separate process.

Using the methods described herein, pole tips and other structures having a width of less than 70 nm can be successfully created.

One such pole tip is a perpendicular pole tip structure, comprising a pole tip layer of magnetic material having a top surface, a bottom surface, and sides extending between the top and bottom surface. Layers of non-magnetic materials surround the layer of magnetic material towards the sides of the pole tip layer. Interface layers are positioned above the non-magnetic material, portions of the interface layers lying along a plane substantially parallel to the top surface of the pole tip layer. Portions of the interface layers taper towards the pole tip layer at a slope that is from about one to about five times a thickness of the pole tip layer, where the thickness of the pole tip layer is defined between the top and bottom surfaces thereof.

In one embodiment, each of the interface layers includes a layer of chemical mechanical polishing resistant material. In another embodiment, a layer of chemical mechanical polishing resistant material is positioned above the top surface of the pole tip layer.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 1 is a schematic representation in section of a recording medium utilizing a longitudinal recording format.

FIG. 2 is a schematic representation of a conventional magnetic recording head and recording medium combination for longitudinal recording as in FIG. 1.

FIG. 3 is a magnetic recording medium utilizing a perpendicular recording format.

FIG. 4 is a schematic representation of a recording head and recording medium combination for perpendicular recording on one side.

FIG. 5 is a schematic representation of the recording apparatus of the present invention, similar to that of FIG. 4, but adapted for recording separately on both sides of the medium.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 6:
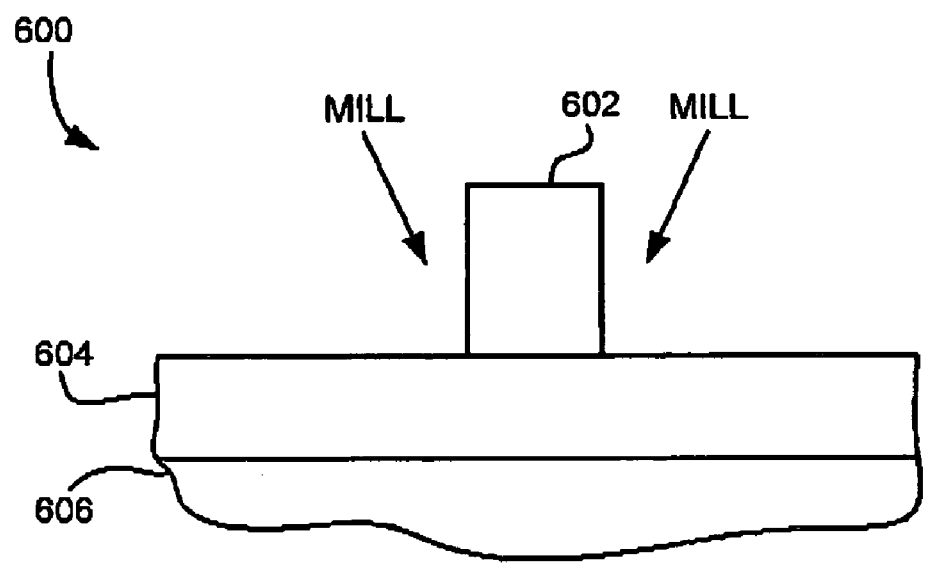
FIG. 6 is an ABS view of a structure to be formed into a pole tip according to a known process.
Figure 7:
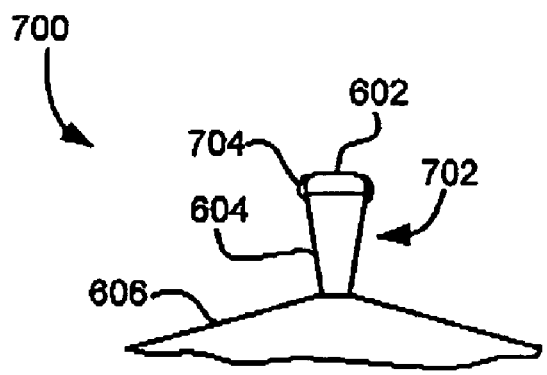
FIG. 7 is an ABS view of the structure of FIG. 6 upon milling.
Figure 8:
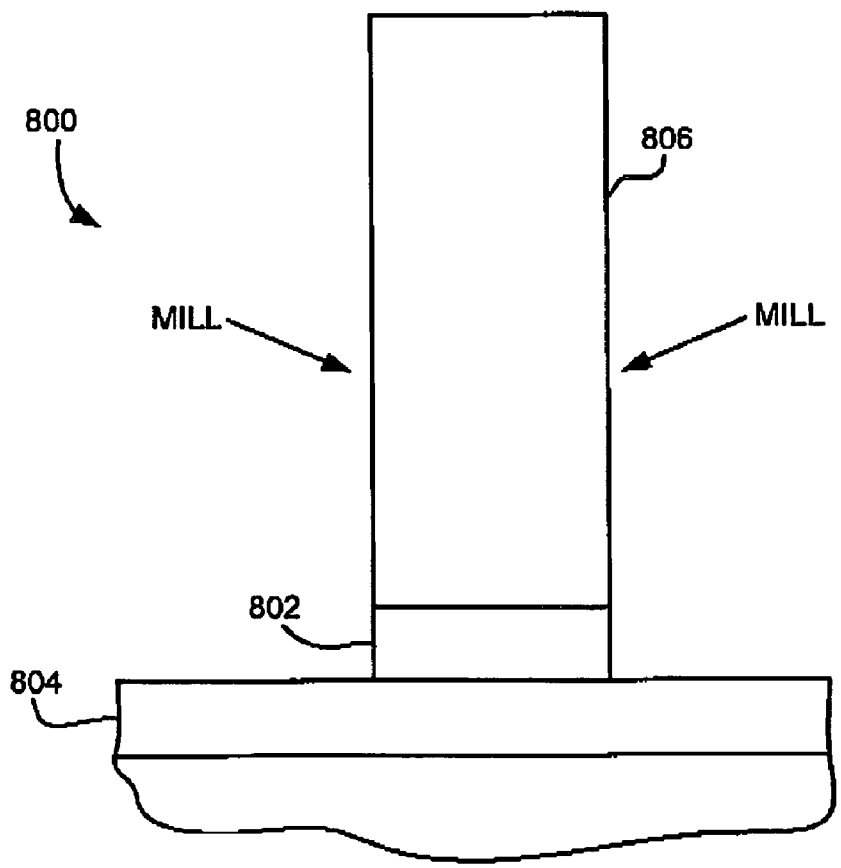
FIG. 8 is an ABS view of a structure to be formed into a pole tip according to a known process.
Figure 9:
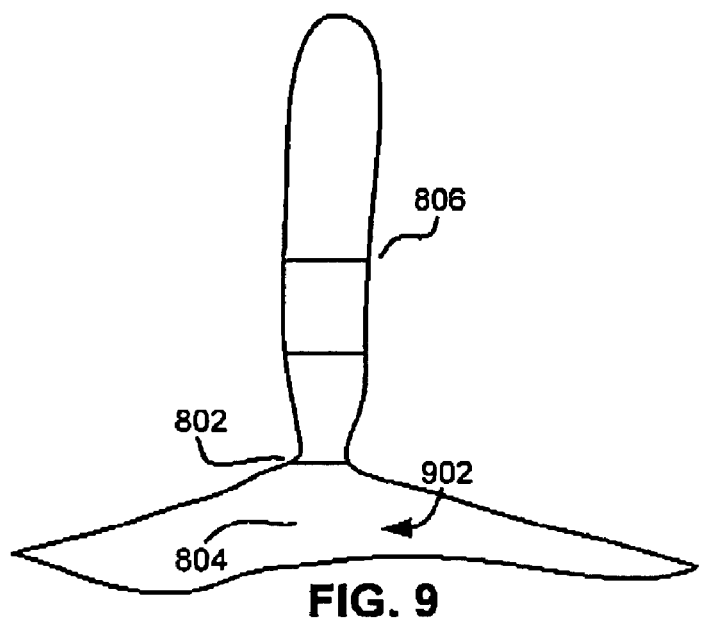
FIG. 9 is an ABS view of the structure of FIG. 8 upon milling.
Figure 10:
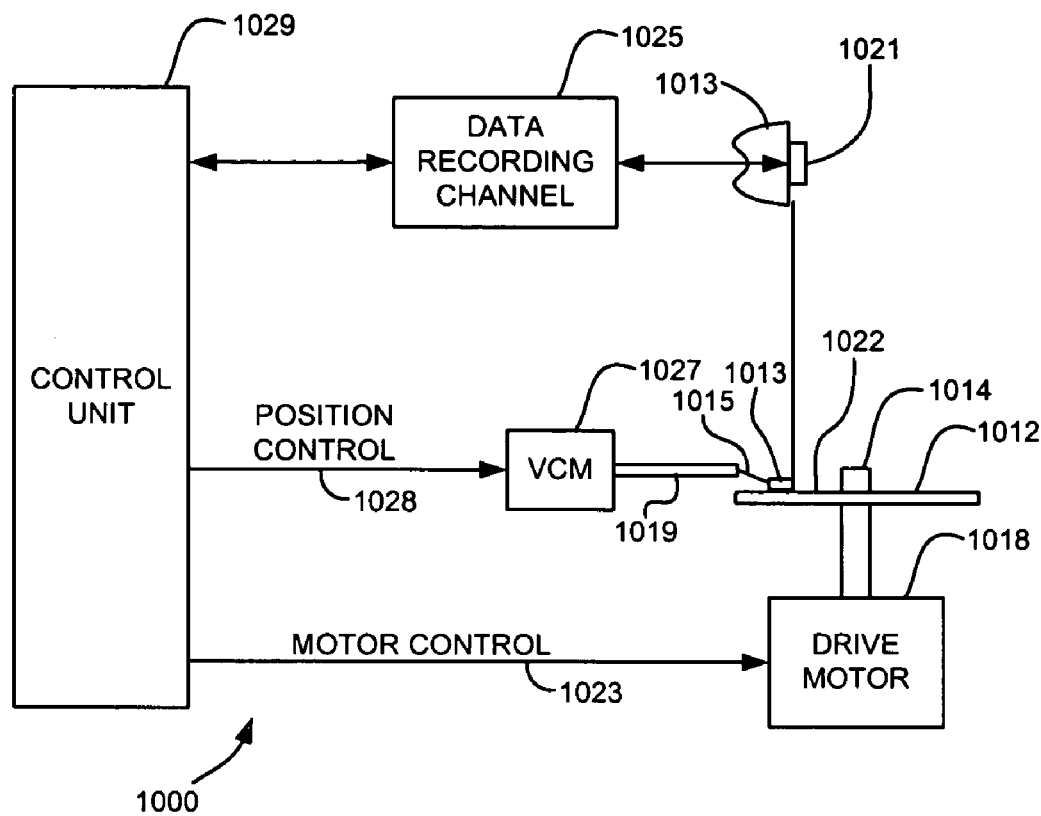
FIG. 10 is a simplified drawing of a magnetic recording disk drive system.

Referring now to FIG. 10, there is shown a disk drive 1000 embodying the present invention. As shown in FIG. 10, at least one rotatable magnetic disk 1012 is supported on a spindle 1014 and rotated by a disk drive motor 1018. The magnetic recording on each disk is in the form of an annular pattern of concentric data tracks (not shown) on the disk 1012.

At least one slider 1013 is positioned near the disk 1012, each slider 1013 supporting one or more magnetic read/write heads 1021. More information regarding such heads 1021 will be set forth hereinafter during reference to the remaining FIGS. As the disks rotate, slider 1013 is moved radially in and out over disk surface 1022 so that heads 1021 may access different tracks of the disk where desired data are recorded. Each slider 1013 is attached to an actuator arm 1019 by way of a suspension 1015. The suspension 1015 provides a slight spring force which biases slider 1013 against the disk surface 1022. Each actuator arm 1019 is attached to an actuator means 1027. The actuator means 1027 as shown in FIG. 10 may be a voice coil motor (VCM). The VCM comprises a coil movable within a fixed magnetic field, the direction and speed of the coil movements being controlled by the motor current signals supplied by controller 1029.

During operation of the disk storage system, the rotation of disk 1012 generates an air bearing between slider 1013 and disk surface 1022 which exerts an upward force or lift on the slider. The air bearing thus counter-balances the slight spring force of suspension 1015 and supports slider 1013 off and slightly above the disk surface by a small, substantially constant spacing during normal operation.

The various components of the disk storage system are controlled in operation by control signals generated by control unit 1029, such as access control signals and internal clock signals. Typically, control unit 1029 comprises logic control circuits, storage means and a microprocessor. The control unit 1029 generates control signals to control various system operations such as drive motor control signals on line 1023 and head position and seek control signals on line 1028. The control signals on line 1028 provide the desired current profiles to optimally move and position slider 1013 to the desired data track on disk 1012. Read and write signals are communicated to and from read/write heads 1021 by way of recording channel 1025.

The above description of a typical magnetic disk storage system, and the accompanying illustration of FIG. 10 are for representation purposes only. It should be apparent that disk storage systems may contain a large number of disks and actuators, and each actuator may support a number of sliders.

Figure 11:
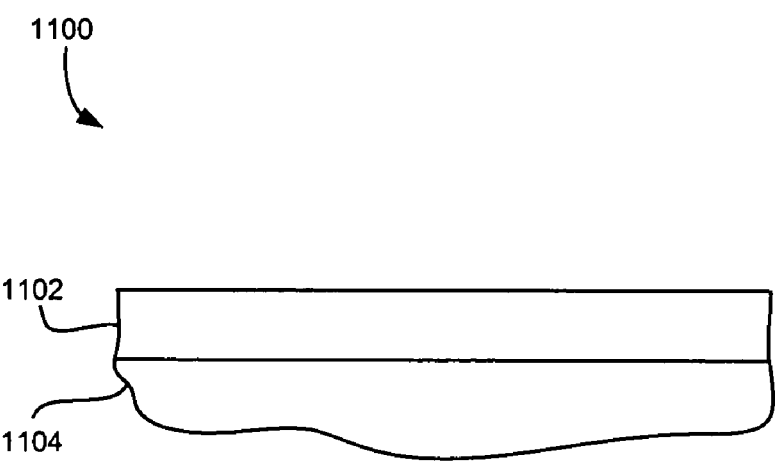
FIG. 11 is an ABS view of a magnetic structure, not to scale, being formed according to one embodiment of the present invention.

FIG. 11 is an ABS view of a structure 1100 formed during a process for forming a magnetic structure such as a perpendicular pole tip. For clarity and ease of understanding, the following description shall refer to creation of a pole tip, it being understood by one skilled in the art that the processes can be adapted with little or no modification to form magnetic structures for various uses. It is also assumed that one can form additional poles and coil layers at different points in the process.

As shown in FIG. 11, a magnetic pole tip layer 1102 is formed on a layer of nonmagnetic material 1104 such as $Al_2O_3$. The pole tip layer 1102 can be formed of any suitable magnetic material including NiFe, CoFe, laminates, etc.

Figure 12:
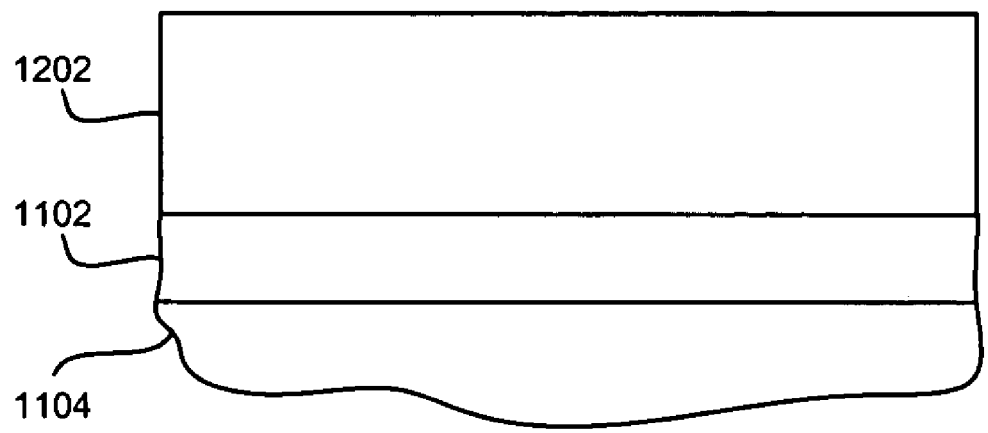
FIG. 12 is an ABS view of the magnetic structure of FIG. 11, not to scale, upon further processing.

As depicted in FIG. 12, a layer of a polyimide precursor polymer 1202 is spun onto the structure of FIG. 11. A preferred polyimide precursor polymer is DURIMIDE®, sold by Arch Chemicals Inc., 501 Merritt 7, P.O. Box 5204, Norwalk, Conn., 06856-5204, USA. Note that instead of a polyimide precursor polymer, other material that upon curing (e.g., baking) forms a material that is polyimide-like may also be used. For clarity, the remaining discussion shall refer to a polyimide precursor polymer, it being understood that this term includes polymers capable of forming polyimides and polyimide-like materials.

The polyimide precursor polymer 1202 is hard baked to cure the polymer 1202, forming the polyimide or polyimide-like material.

Figure 13:
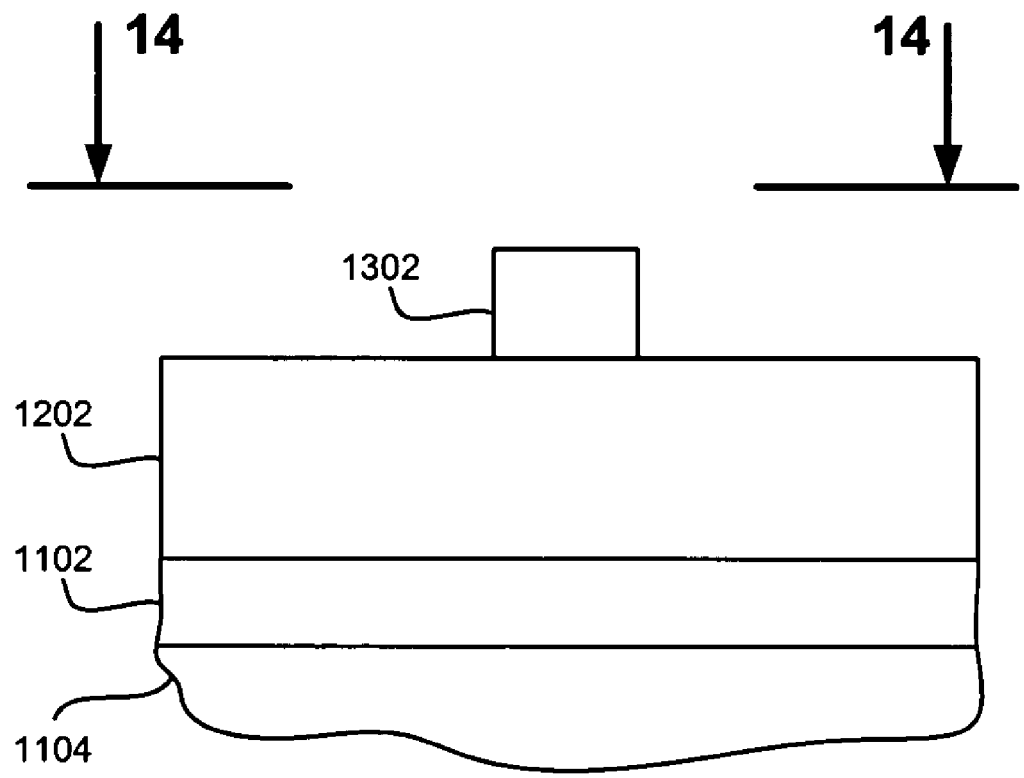
FIG. 13 is an ABS view of the magnetic structure of FIG. 12, not to scale, upon further processing.

Referring to FIG. 13, to form the desired shape of the cured polyimide precursor polymer 1202, a silicon-containing resist layer 1302 is added and patterned to allow patterning of the cured polyimide precursor polymer 1202. Photo-exposable or electron beam exposable Si-containing resists may be used. A preferred Si-containing resist is an e-beam resist such as hydrogen silsesquioxane (HSQ), sold by Dow Corning Corporation, Corporate Center, PO box 994, Midland, Mich., 48686-0994, USA.

Figure 14:
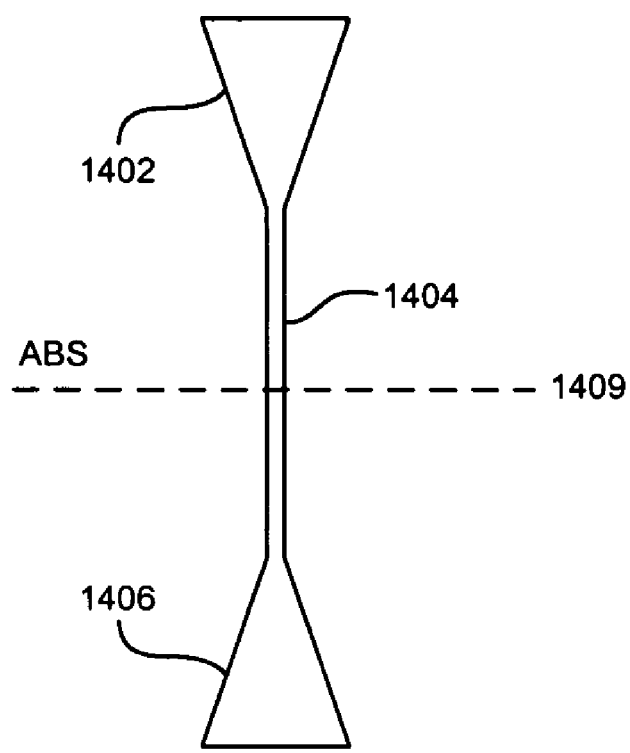
FIG. 14 is an ABS view of the magnetic structure of FIG. 13, not to scale, upon further processing.

FIG. 14 is a top down depiction of the structure of FIG. 13. As shown, the e-beam exposes an anchor pad 1402, a line (pole) 1404, and another anchor pad 1406. The anchor pads 1402, 1406 add stability to the pole 1404 so that it is less likely to tip over during subsequent processing. In addition, the exposed surface (i.e., ABS) of the slider 1409 should coincide with the pole.

Figure 15:
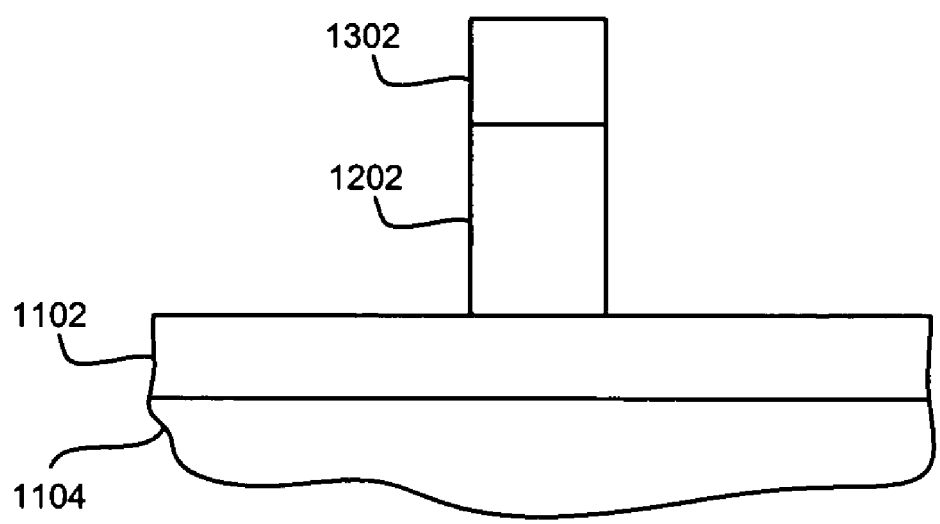
FIG. 15 is an ABS view of the magnetic structure of FIG. 14, not to scale, upon further processing.

The Si-containing resist 1302 is exposed to an oxygen plasma, which converts the resist 1302 to a material that is like glass, e.g., SiOx. The SiOx mask is then used as a hard mask to RIE with an oxygen-containing plasma (e.g., $CO_2$ plasma) to form the polyimide stack, as shown in FIG. 15. In general terms, the resulting structure is a patterned polyimide layer and a Si-containing mask on top of a polyimide layer.

Figure 16:
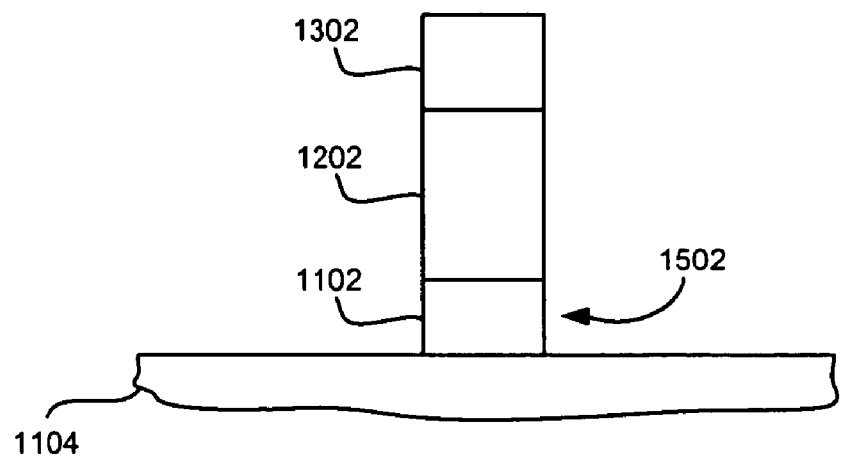
FIG. 16 is an ABS view of the magnetic structure of FIG. 15, not to scale, upon further processing.

The structure of FIG. 15 is milled, such as by ion beam milling, to remove the exposed portions of the pole tip layer 1102, thereby forming the pole tip 1502. The resulting structure is shown in FIG. 16. Subsequent processing, described in more detail below, is used to remove the polyimide layer and any remaining resist.

Note that in the above process, as well as in the subsequently discussed processes, additional layers may be added to the structures if desired.

Figure 17:
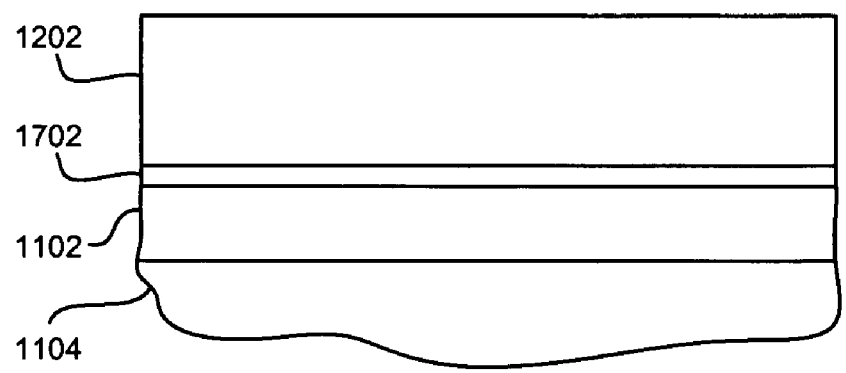
FIG. 17 is an ABS view of a magnetic structure, not to scale, being formed according to one embodiment of the present invention.

In a preferred process, a pole tip layer 1102 is formed on a layer of nonmagnetic material 1104 as above. As shown in FIG. 17, the pole tip layer 1102 is coated with a first chemical mechanical polishing (CMP)-resistant layer 1702 prior to addition of the polyimide precursor polymer 1202. The CMP-resistant layer 1702 is hard such that it is more resistant to removal by CMP than other surrounding materials. The CMP-resistant layer 1702 is preferably formed of diamond-like carbon (DLC) of a thickness greater than about 50 Å, and ideally in the range of about 100–1000 Å. A thin layer of an adhesive (not shown) can be added to the pole tip layer 1102 prior to coating with the CMP resistant layer to aid in adhering the CMP-resistant layer 1702 to the pole tip layer 1102. For example a layer of Si-containing adhesive having a thickness of about 5–20 Å can be used.

Then, the polyimide precursor polymer 1202 and Si-containing resist 1302 are formed, cured and patterned as described above, resulting in the structure shown in FIG. 18.

Figure 18:
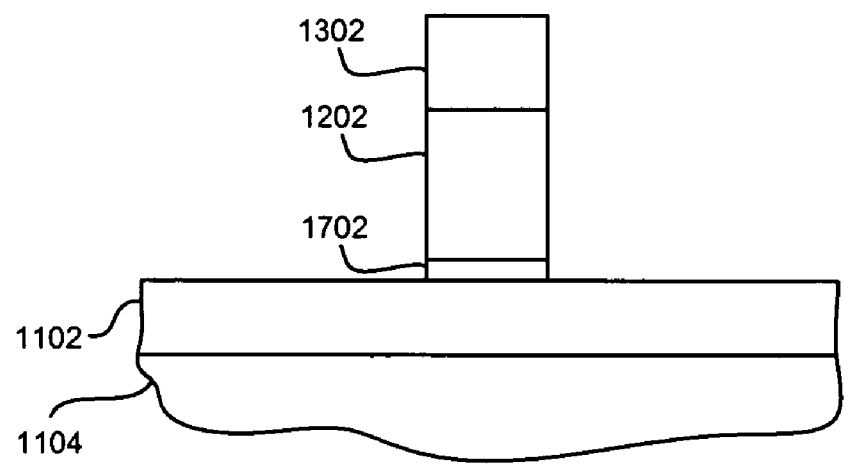
FIG. 18 is an ABS view of the magnetic structure of FIG. 17, not to scale, upon further processing.
Figure 19:
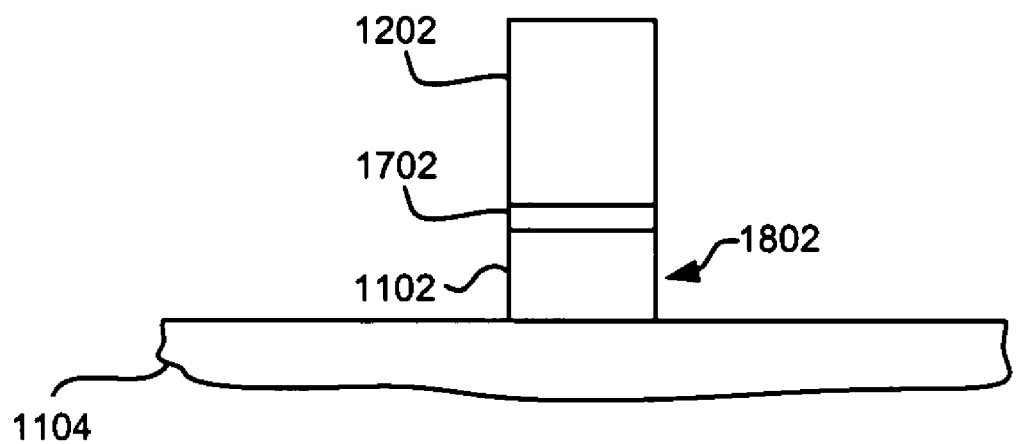
FIG. 19 is an ABS view of the magnetic structure of FIG. 18, not to scale, upon further processing.

The structure of FIG. 18 is milled to define the pole tip 1802, which is shown in FIG. 19.

The actual milling process will vary depending on the type of tool selected, gas used, ion energies, etc. The mill pattern may also vary. For example, the wafer can be rotated in one direction, sweep milling (oscillating rotation) can be performed, etc. Preferably the milling is performed at alternating mill angles of less than 25 degrees from normal to remove the exposed portions of the pole tip layer 1102 and greater than 50 degrees from normal to remove redeposition, where normal is defined as perpendicular to the plane of the layers of materials and parallel to the ABS. The structure is preferably milled such that the pole tip 1802 has a certain amount of beveling to form a trapezoidal shape. The trapezoidal shape reduces the likelihood of writing to adjacent tracks, translating into a lower error rate. The inventors have found that alternating milling at about 10 degrees and at about 70 degrees from normal provide a beveled pole tip 1802 without substantial amounts of redeposition.

Figure 20:
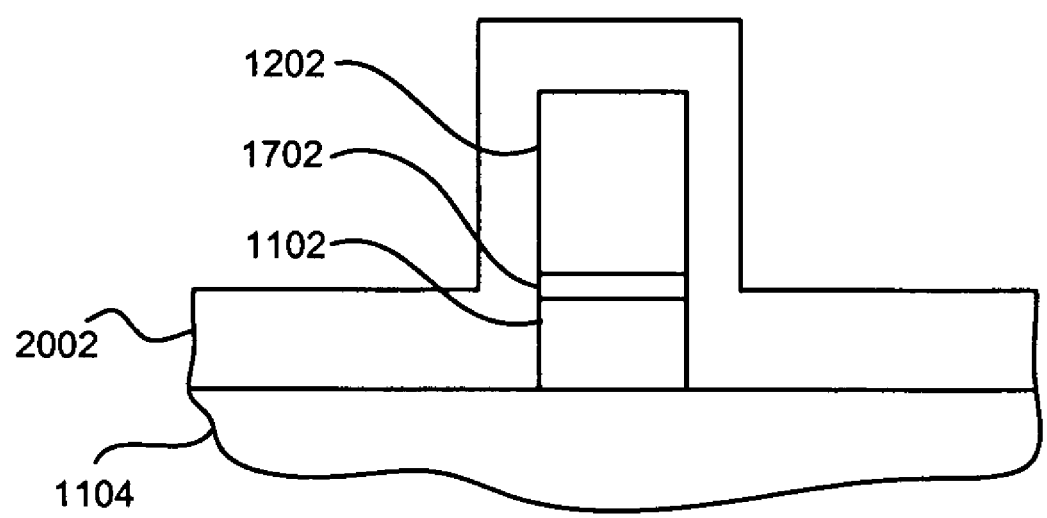
FIG. 20 is an ABS view of the magnetic structure of FIG. 19, not to scale, upon further processing.

As shown in FIG. 20, after milling, the entire surface is coated with a nonmagnetic material 2002, preferably alumina (e.g., AlOx), by full film deposition. The entire thickness of the alumina layer 2002 is preferably about as thick as or thicker than the thickness of the pole tip 1802. Making the alumina layer 2002 as thick as or thicker than the pole tip 1802 prevents the pole tip 1802 from delaminating from its underlayer and/or tipping over during later CMP, as well as aiding in the prevention of CMP damage to the pole tip 1802 itself. The thickness of alumina refill 2002 is preferably in the range of about 100–500% the thickness of the pole tip 1802. More than 500% can result in the subsequent CMP not being able to remove enough material to expose the resist to solvent.

Figure 21:
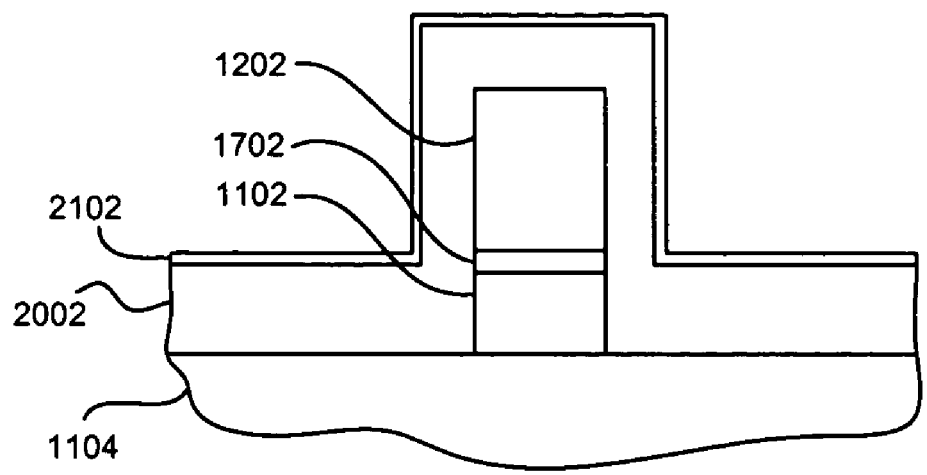
FIG. 21 is an ABS view of the magnetic structure of FIG. 20, not to scale, upon further processing.

On top of the AlOx fill, a second CMP-resistant layer 2102 (e.g., DLC), or interface layer, is deposited full film onto the structure, as depicted in FIG. 21. The thickness of the second CMP-resistant layer 2102 may or may not be the same as that of the first CMP-resistant layer 1702. A preferred thickness of the second CMP-resistant layer 2102 should be greater than about 50 Å, and is ideally in the range of about 100–1000 Å.

The upper surface of the second CMP-resistant layer 2102 is preferably located at or above the plane of the upper surface of the pole tip 1802 to prevent the pole tip 1802 from delaminating from its underlayer and/or tipping over during later CMP, as well as aiding in the prevention of CMP of the pole tip 1802 itself.

Figure 22:
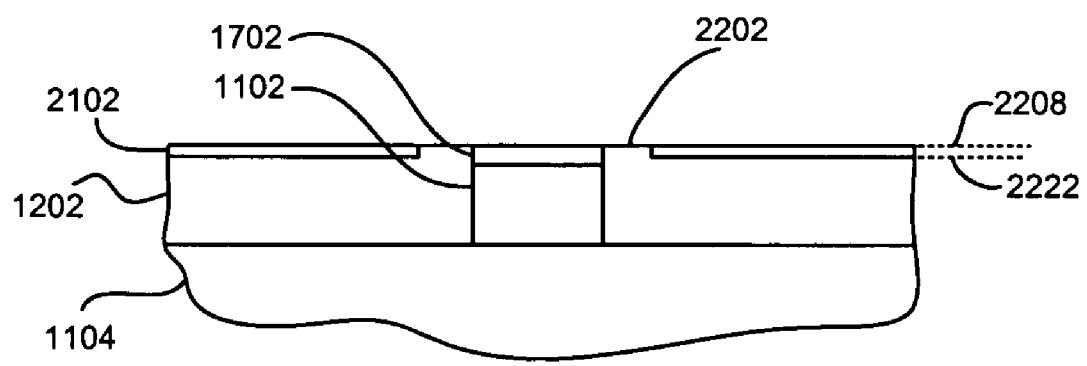
FIG. 22 is an ABS view of the magnetic structure of FIG. 21, not to scale, upon further processing.

The structure shown in FIG. 21 is polished such as by CMP to create the structure shown in FIG. 22. The amount of polishing is important, as it is desirable to avoid any CMP of the pole tip material to avoid damage to the pole tip 1802, which could result in the pole tip 1802 having a variable track width. However, too little CMP may result in not breaking open the anchor pad to allow solvent to reach the remaining polyimide-like layer 1202. Also, some of the resist may remain encapsulated by material redeposited during the milling. Too much CMP may result in damaging the pole tip 1802. Thus, the structure is preferably polished down to or into the first CMP-resistant layer 1702, but not remove the layer 1702.

The preferred CMP process is very gentle. In one embodiment, the wafer is rotated one or more times for a duration of less than about a minute, and preferably less than 30 seconds, under the CMP pad at a pressure of less than about 5 psi and in a nonreactive slurry (e.g., a slurry that does not readily etch the pole tip material) such as CABO-SPERSE® SCI available from Cabot Microelectronics, 870 N. Commons Drive, Aurora, Ill. 60504, USA.

Solvent is applied to remove any remaining resist exposed by the CMP. The carbons can be removed with an oxygen plasma, leaving an essentially (but not necessarily perfectly) coplanar surface of alumina 2002, the pole tip 1802 (e.g., NiFe), and alumina 2002.

Because the alumina refill 2002 is thicker than the pole tip 1802, portions of the alumina refill 2002 adjacent the pole tip will tend to taper towards the pole tip 1802 at a slope that is from about one to about five times a thickness of the pole tip 1802 after the polish process.

FIG. 22 also shows that the completed pole tip contains a transition length 2202 consisting of the non-magnetic material 1202. It should also be noted that it is likely that the plane 2208 defined substantially away from the pole will ideally be inside the field CMP-resistant layer 2102. This plane 2208 will be slightly higher than the plane 2222 defined by the top surface of the pole tip 1102. Therefore, it is not unexpected that this creates a transition 2202 between the two aforementioned planes 2208, 2222.

Additional layers can then be added for forming additional portions of the structure. Because the upper surface of the formed structure is essentially flat, the additional layers will be more easily formed.

The process described herein has been used to form pole tips of about 69 nm wide, and can be used to form pole tips of even smaller widths.

EXAMPLES

Figure 23:
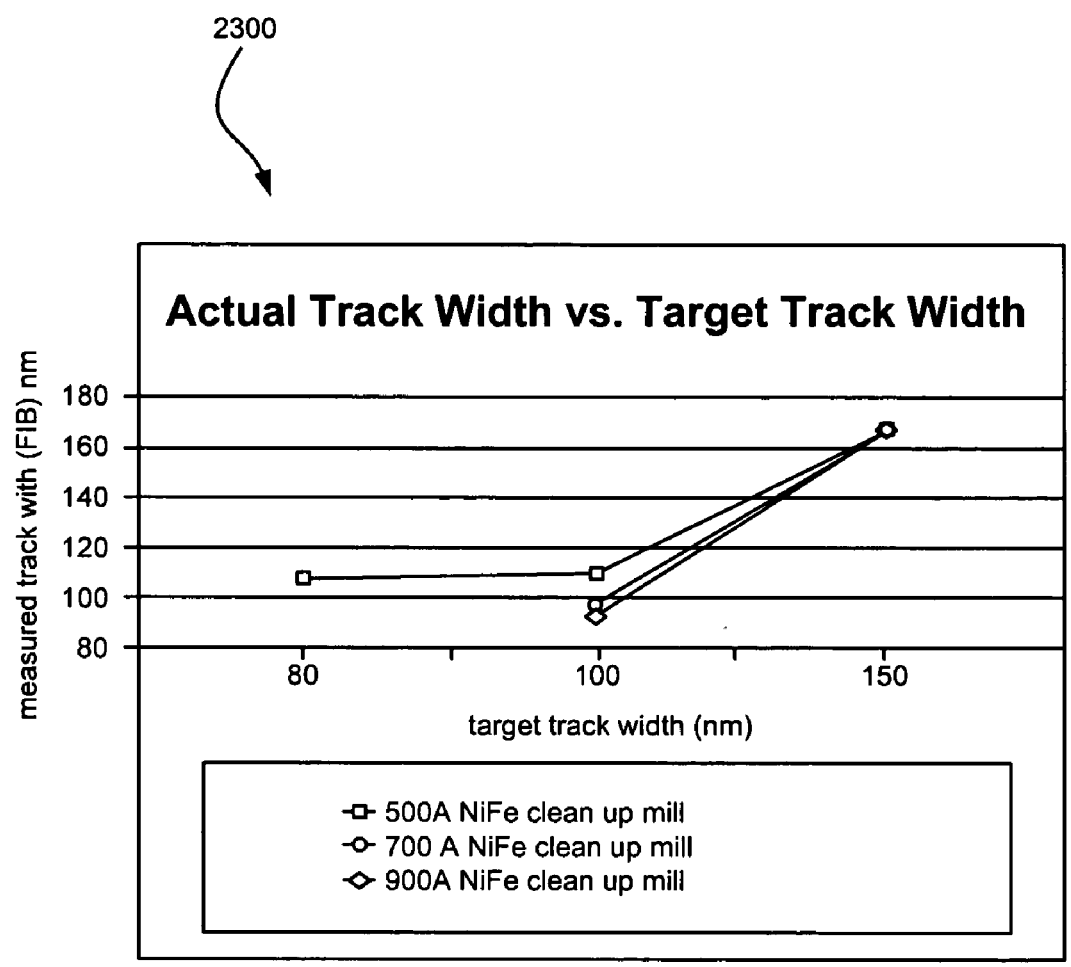
FIG. 23 is a chart of experimental data showing actual track widths of pole tips formed by the process described above vs. target track widths.

FIG. 23 is a chart 2300 of experimental data showing actual track widths of pole tips formed by the process described above vs. target track widths. As shown, the actual track widths are nearly on target. For example, when the target track width created in the hard mask layer 1302 was 150 nm, the actual track width was about 160 nm. When the target track width was 100 nm, the actual track width was about 100 nm (±10%). What is also mentioned in FIG. 23 is various thicknesses of a "clean up" mill. This simply was to illustrate that the mill time at high angle (to remove redeposition from the milling) influences the track width and the amount of bevel angle that is found in the final pole tip 1102. The "clean up" mill of longer time is equivalent of removing greater amounts of NiFe.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A perpendicular pole tip structure, comprising:
   a pole tip layer of magnetic material having a top surface, a bottom surface, and sides extending between the top and bottom surface;
   layers of non-magnetic materials surrounding the layers of magnetic material towards the sides of the pole tip layer; and
   CMP resistant layers above the non-magnetic material, portions of the CMP resistant layers lying along a plane substantially parallel to the top surface of the pole tip layer.

2. A perpendicular pole tip structure as recited in claim 1, wherein each of the interface CMP resistant layers includes a layer of diamond like carbon (DLC).

3. A perpendicular pole tip stnxcture as recited in claim 1, further comprising a layer of chemical mechanical polishing resistant material above the top surface of the pole tip layer.

4. A pole tip structure as in claim 3 wherein the CMP resistant material above the top surface of the pole tip layer comprises diamond like carbon (DLC).

5. A perpendicular pole tip structure as in claim 1 wherein the non-magnetic layers comprise alumina.

6. A magnetic storage system, comprising:
   magnetic media;
   at least one perpendicular head for reading from and writing to the magnetic media, the bead comprising:
   a pole tip layer of magnetic material having a top surface, a bottom surface, and sides extending between the top and bottom surface;
   layers of non-magnetic materials surrounding the layer of magnetic material towards the sides of the pole tip layer; and
   CMP resistant layers above the non-magnetic material, portions of the CMP resistant layers lying along a plane substantially parallel to the top surface of the pole tip layer;
   a slider for supporting the head; and
   a control unit coupled to the head for controlling operation of the head.

7. A magnetic storage system as recited in claim 6, wherein each of the CMP resistant layers includes a layer of diamond like carbon (DLC).

8. A magnetic storage system as recited in claim 6, further comprising a layer of chemical mechanical polishing resistant material above the top surface of the pole tip layer.

9. A magnetic storage system as in claim 8 wherein the CMP resistant material above the top suribee of the pole tip layer comprises diamond like carbon (DLC).

10. A magnetic storage system as in claim 6 wherein the non-magnetic layers comprise alumina.

\* \* \* \* \*

UNITED STATES PATENT AND TRADEMARK OFFICE
CERTIFICATE OF CORRECTION

PATENT NO. : 7,139,153 B2  Page 1 of 1
APPLICATION NO. : 10/785236
DATED : November 21, 2006
INVENTOR(S) : Hsiao et al.

It is certified that error appears in the above-identified patent and that said Letters Patent is hereby corrected as shown below:

In claim 2, column 9, line 2, between "each of the" and "CMP resistant", please delete "interface".

In claim 3, column 9, line 4, please replace "stnxcture" with --structure--.

In claim 6, column 9, line 15, please replace "bead" with --head--.

In claim 9, column 10, line 16, please replace "suribee" with --surface--.

Signed and Sealed this

Fifteenth Day of June, 2010

David J. Kappos
*Director of the United States Patent and Trademark Office*